United States Patent [19]

Matsuda et al.

[11] 3,899,382

[45] Aug. 12, 1975

[54] ANAEROBIC BONDING AGENT

[76] Inventors: Hideaki Matsuda, 2-738, Tsunomori-cho, Marugame-shi, Kagawa-ken; Takanori Okamoto, 7-651, Hukami, Horie, Oaza, Tadotsu-cho, Nakatado-gun Kagawa-ken, both of Japan

[22] Filed: Mar. 8, 1973

[21] Appl. No.: 339,065

[52] U.S. Cl. ............... 156/327; 156/332; 156/334; 252/182; 252/186; 260/29.6 H; 260/78.4 E; 260/89.5 R
[51] Int. Cl. ........................... C09j 3/16; C09j 5/00
[58] Field of Search ....... 252/182, 186; 260/29.6 H, 260/78.4 E, 89.5 R; 156/327, 332, 334

[56] References Cited
UNITED STATES PATENTS
3,631,154  12/1971  Kawaguchi.................... 260/78.4 E
FOREIGN PATENTS OR APPLICATIONS
2,001,547  7/1971  Germany....................... 260/78.4 E

*Primary Examiner*—Benjamin R. Padgett
*Assistant Examiner*—Irwin Gluck
*Attorney, Agent, or Firm*—Wenderoth, Lind & Ponack

[57] ABSTRACT

An anaerobic bonding agent which is prepared by adding a small quantity of organic peroxide to a mixture of a polyvalent metal salt of a compound represented by the following formula:

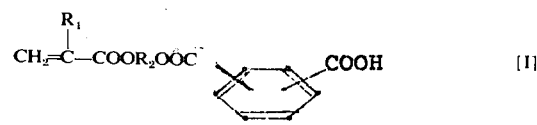

wherein $R_1$ denotes hydrogen or methyl, $R_2$ denotes an aliphatic or alicyclic or aromatic polyhydric alcohol residue which can be substituted with halogen or —OH or contain an —O— bond and a compound containing acrylic group or methacrylic group in the molecule and, if desired, a small quantity of water and/or polyhydric alcohol and/or amine.

7 Claims, No Drawings

ANAEROBIC BONDING AGENT

DETAILED DESCRIPTION OF THE INVENTION

This invention relates to a bonding agent having anaerobic curing properties which is prepared by adding a small quantity of organic peroxide to a mixture of a polyvalent metal salt of a compound represented by the following formula:

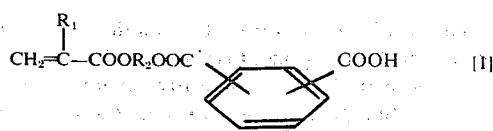

wherein $R_1$ denotes hydrogen or methyl, $R_2$ denotes an aliphatic or alicyclic or aromatic polyhydric alcohol residue which can be substituted with halogen, -OH group or contain an -O- and a compound containing an acrylic group or methacrylic group in the molecule and, if desired, a small quantity of water and/or polyhydric alcohol and/or amines.

Heretofore, a large number of so-called anaerobic bonding agents which have bonding action by causing polymerization reaction and hardening after excluding air have been known to the art and because of this unique quality, the demand for this composition has been on the increase as means for improving the production efficiency and for eliminating the labor which is required in bonding operations, such as repairing bearing motor shafts or sealing pipe joints, particularly, locking metallic bolts and nuts. However, to effect good bonding, the surfaces to be bonded must be freed of soil, particularly grease and oil.

This invention avoids the foregoing drawbacks since it employs the polyvalent metal salt of the compound represented by the formula (I), mentioned above, and which makes it possible to bond oily surfaces (hereinafter referred to as oil surface bonding), which has been extremely difficult with the conventional bonding agents. This not only facilitates bonding but also eliminates problems such as generation of rust on a deoiled surface. Thus, the present invention constitutes a significant advance in the bonding art.

The compound represented by the formula (I) can be easily produced from low cost raw materials. Where $R_1$ is hydrogen, the compound is an acrylate derivative, and where $R_1$ is methyl, it is methacrylate derivative. $R_2$ is, as described in the foregoing, aliphatic, alicyclic or aromatic polyhydric alcohol residue which, if desired, may be substituted by halogen, —OH or contain an —O— bond. The length of chain need not be particularly limited, but a relatively short chain length, such as ethylene group, propylene group, chloropropylene group and diethylene ether group, is preferable.

Although there is no particular method needed for producing the polyvalent metal salt of the compound of the formula (I), in general it is preferable to produce it by neutralization with a polyvalent metal oxide, hydroxide or carbonate. In this neutralization reaction, it is preferable to use inert solvents, such as benzene or toluene as the solvent or a compound which contains acrylic group or methacrylic group as will be described hereinafter, in which case the solvent will become a component of the composition of the bonding agent after the neutralization reaction. In case the inert solvent is used, the compound represented by the formula (I) is dissolved in the inert solvent and the predetermined amount of the oxide of polyvalent metal salt or hydroxide or carbonate is added in proper amount to carry out the neutralization reaction. The water generated by the reaction can be eliminated with the solvent when the solvent is removed after the reaction. Also, in case the solvent is the benzene, it can be removed from the system by refluxing during the reaction or after the reaction. The composition of the present invention can be obtained by mixing various components, as will be described hereinafter, in the polyvalent metal salt of the formula (I).

When a compound containing the acrylic group or methacrylic group is used as the solvent, the compound of the formula (I) is dissolved in the solvents and similar to the above, a predetermined amount of the oxide or hydroxide of the polyvalent metal or the carbonate is added in proper amount to carry out the neutralization reaction. The water generated at that time will work as the bonding accelerator, and is an advantage in that there is no need to remove it. The solvent in this case can be used as it is as one of the components of the bonding agent composition after the neutralization reaction and, therefore, it is extremely advantageous.

In the present invention, as the compound containing the acrylic group or methacrylic group to be mixed into the polyvalent metal salt of the formula (I) are, for example, alkylesters such as methyl, ethyl, propyl, butyl or lauryl esters of methacrylic acid or acrylic acid, acrylates or methacrylates containing hydroxyl groups such as hydroxyethyl, hydroxypropyl, hydroxychloropropyl, mono, di- or polyacrylate or methacrylates of polyhydric alcohols and polyesteracrylates and depending on the case, the compound of the formula (I) can be used. One or more kinds thereof may be used.

The viscosity and bonding strength of the bonding agent to be obtained by changing the composition of the mixture can be freely adjusted.

In the present invention, it has been discovered that the bonding agent having anaerobic curing properties which is capable of bonding on the oily surfaces can be obtained by adding a small amount of organic peroxide as the polymerization catalyst to the mixture of the polyvalent metal salt of the formula (I) and the compound containing the acrylic group or methacrylic group as mentioned above, and by adding a small amount of polyhydric alcohol, amines or water, if desired.

As the organic peroxide which is the polymerization catalyst, for example, methylethylketone peroxide, cumene hydroperoxide, benzoylperoxide, and tert-butylhydroperoxide can be enumerated, and the amount in which it is added is preferably about 0.5 – 10 percent by weight. Amines and polyhydric alcohols, similar to water as the neutralization reaction by-product mentioned in the foregoing, not only work as the bonding accelerator but also work effectively as the gelation stabilizing agent at room temperatures and the amount of addition may be sufficient with a small amount, such as less than 10% by weight. Also depending on the case, a small amount of polymerization inhibitor, such as quinones, may be added. Such inhibitor may be present when the compound of the formula (I) is being synthesized, and the compound of formula (I) can be used without removal thereof.

The present invention will now be concretely described by reference to the following examples. (Comparative example)

MEASUREMENT OF BONDING STRENGTH OF THE OTHER COMMERCIALLY AVAILABLE ANAEROBIC BONDING AGENTS

For the purpose of comparing the above-mentioned bonding agents with the anaerobic bonding agent of the present invention, the bonding strength of the other anaerobic bonding agent for ⅜ inch iron bolt nut was measured. The measurement (Table 1) was obtained by measuring the torque at the time of rupture of the bonding by the torque wrench after several drops of the bonding agent were applied to the screw thread of the bolt and the nut is set with the torque of 0 kg cm and was left over for 24 hours at 23°C. The other examples were carried out by this method. In the Table, the "de-oiled bolt and nut" was one on which the adhered oil was completely removed with trichloroethylene. The bolt and nut "adhered with rust preventing oil" is a commercially available bolt and nut which was not freed of oil.

Table 1

Bonding property of the other commercially available anaerobic bonding agent (selected from the bonding agent having the highest strength from the catalogue value)

| Material to be attached | Anaerobic bonding agent of | | | |
|---|---|---|---|---|
| | A co. | B co. | C co. | D co. |
| Deoiled bolt and nut | 270 | 50 | 100 | 400 |
| Bolt and nut adhered with rust preventing oil | 130 | 40 | 50 | 230 |

Unit kg. cm

As will be obvious from the Table 1, the other presently commercially available anaerobic bonding agent could provide sufficiently strong bonding force in case of the deoiled bolt and nut, but in case of the bolt and nut adhered with rust-preventing oil, such bonding force was not sufficient.

EXAMPLE 1

1 mol of 2-hydroxyethylmethacrylate, 1 mole of phthalic anhydride, 200 ppm of parabenzoquinone as the polymerization inhibitor and 0.1 mole/kg of N,N-dimethylbenzylamine as the catalyst for the addition reaction were placed in a reaction vessel and the mixture was reacted for 5 hours at 90°C to obtain ethyleneglycolmethacrylatephthalate. (In this case, when N,N-dimethylbenzylamine was used, it was not required to be removed before curing.

30 parts of methylmethacrylate was dissolved in 70 parts of the ethyleneglycolmethacrylatephthalate and the carboxyl group is neutralized as follows, and then the polymerization catalyst was added to obtain the following anaerobic bonding agents.

| Anaerobic bonding agent I: | was neutralized with Zn (OH)₂ and 5% by weight of cumenehydroperoxide was added. |
|---|---|
| Anaerobic bonding agent II: | was neutralized with Zn (OH)₂ and 2% by weight of ethyleneglycol and then 5% by weight of cumene hydroperoxide was added. |
| Anaerobic bonding agent III: | was neutralized with CdO and 2% by weight of n-hexylamine and thereafter 5% by weight of cumenehydroperoxide was added. |

The result of measuring the bonding strength of the anaerobic bonding agent is shown in Table II and as will be obvious from the comparative example, the oil surface bonding property was excellent as compared with other commercially available products. The material to be bonded and the method of bonding were similar to the comparative example.

Table II

| | Bonding Strength | |
|---|---|---|
| Anaerobic bonding agent | Deoiled bolt and nut | Bolt and nut adhered with rust-preventing oil |
| I | 300 kg. cm | 320 kg. cm |
| II | 400 kg. cm | 350 kg. cm |
| III | 320 kg. cm | 300 kg. cm |

EXAMPLE 2

30 parts of ethylmethacrylate was dissolved in 70 parts of diethylene glycol methacrylate phthalate and then the carboxyl group was neutralized. Then the polymerization catalyst was added to obtain the anaerobic bonding agent.

| Anaerobic bonding agent IV: | was neutralized with Ca (OH)₂ and 2% by weight of benzylamine and then 2% by weight of cumene hydroperoxide was added. |
|---|---|
| Anaerobic bonding agent V: | was neutralized with Mg (OH)₂ and 1% by weight of 2-ethylhexylamine and then 2% by weight of 60% dimethylphthalate of methylethylketone peroxide was added. |

The bonding strength of the anaerobic bonding agents D and E were measured in the same way as in the comparative example. The bolt and nut adhered with rust-preventing oil when bonded with D and E showed more than 350 kg. cm breaking torque value.

We claim:

1. An anaerobic bonding agent which comprises an admixture of
   a. an organic peroxide,
   b. a polyvalent metal salt of a compound of the formula:

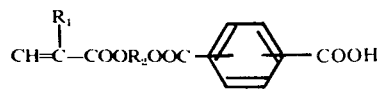

wherein $R_1$ is hydrogen or methyl, $R_2$ is an aliphatic or aromatic polyhydric alcohol residue which can be substituted with halogen, —OH or contain an —O— bond, c. a compound containing an acrylic or methacrylic group selected from the group consisting of alkyl esters of acrylic or methacrylic acid, mono or polyacrylate esters of mono or polyhydric alcohols, mono or poly-methacrylate esters of mono or polyhydric alcohols, or polyester acrylates.

2. An anaerobic bonding agent according to claim 1, wherein the bonding agent additionally contains water, a polyhydric alcohol or an amine.

3. An anaerobic bonding agent according to claim 1 wherein component c) is ethylmethacrylate.

4. An anaerobic bonding agent according to claim 3 wherein component b) is the calcium or magnesium salt of diethyleneglycolmethacrylatephthalate.

5. An anaerobic bonding agent according to claim 4 wherein component a) is cumenehydroperoxide or the dimethylphthalate of methylethylketone peroxide.

6. An anaerobic bonding agent according to claim 5 which additionally contains benzylamine or 2-ethylhexylamine.

7. A method for bonding oily surfaces which comprises applying the composition of claim 1 to said surfaces to be bound, placing said surfaces in contact with each other and curing said composition.

* * * * *